(12) United States Patent
Ikari et al.

(10) Patent No.: US 7,710,637 B2
(45) Date of Patent: May 4, 2010

(54) METHOD AND APPARATUS FOR GENERATING TERAHERTZ WAVE

(75) Inventors: Tomofumi Ikari, Miyagi (JP); Hiroaki Minamide, Miyagi (JP); Hiromasa Ito, Miyagi (JP)

(73) Assignee: Riken, Saitama (JP)

( * ) Notice: Subject to any disclaimer, the term of this patent is extended or adjusted under 35 U.S.C. 154(b) by 495 days.

(21) Appl. No.: 11/721,278

(22) PCT Filed: Dec. 6, 2005

(86) PCT No.: PCT/JP2005/022328

§ 371 (c)(1),
(2), (4) Date: Jun. 8, 2007

(87) PCT Pub. No.: WO2006/062073

PCT Pub. Date: Jun. 15, 2006

(65) Prior Publication Data

US 2009/0251767 A1 Oct. 8, 2009

(30) Foreign Application Priority Data

Dec. 8, 2004 (JP) ............................... 2004-355182

(51) Int. Cl.
*G02F 1/35* (2006.01)
*G02F 2/02* (2006.01)

(52) U.S. Cl. ..................................................... 359/330

(58) Field of Classification Search .......... 359/326–332
See application file for complete search history.

(56) References Cited

U.S. PATENT DOCUMENTS 7,626,756 B2 * 12/2009 Dunn et al. ................. 359/330
2009/0021825 A1 * 1/2009 Dunn et al. ................. 359/330

FOREIGN PATENT DOCUMENTS

| JP | 09-146131 | 6/1997 |
| JP | 2002-072269 | 3/2002 |
| JP | 2004-317573 | 11/2004 |

OTHER PUBLICATIONS

Kawase, Kodo et al., "Arrayed silicon prism coupler for a terahertz-wave parametric oscillator," Applied Optics, Mar. 20, 2001, vol. 40. No. 9, pp. 1423-1426.
Kawase, Kodo et al., "Terahertz wave parametric source," Journal of Physics D: Applied Physics, No. 35, 2002, pp. R1-R14.
International Search Report issued in corresponding application No. PCT/JP2005/022328, completed Feb. 13, 2006 and mailed Feb. 21, 2006.
Weiss, C. et al. "Generation of tunable narrow-band surface-emitted terahertz radiation in periodically poled lithium niobate," Optics Letters, Apr. 15, 2001, vol. 26., No. 8, pp. 563-565.

* cited by examiner

*Primary Examiner*—Hemang Sanghavi
(74) *Attorney, Agent, or Firm*—Griffin & Szipl, P.C.

(57) ABSTRACT

A method and an apparatus for generating a terahertz wave, wherein one end face 12a of a non-linear optical crystal 12 is positioned approximately orthogonally to a direction of generation of a terahertz wave 4, pump light 2 and idler light 3 are totally reflected at an approximately same point 13 on the end face, and the generated terahertz wave 4 is emitted roughly vertically to the end face.

13 Claims, 7 Drawing Sheets requirement for angle phase matching

METHOD AND APPARATUS FOR GENERATING TERAHERTZ WAVE

This is a National Phase Application in the U.S. of International patent application No. PCT/JP2005/022328 filed Dec. 6, 2005, which claims priority on Japanese Patent Application No. 355182/2004, filed Dec. 8, 2004. The entire disclosures of the above patent applications are hereby incorporated by reference.

TECHNICAL FIELD

The present invention relates to a method and an apparatus for generating a terahertz wave under a non-colinear phase matching condition. The present invention more particularly relates to a method and an apparatus in which a terahertz wave generated in a crystal is taken out of the crystal.

BACKGROUND ART

An electromagnetic wave having a frequency around 1 THz, that is, a far infrared ray and a submillimeter wave in this region is referred to as a "terahertz wave". The terahertz wave is positioned at a boundary between a light wave and a radio wave, and has characteristics of both of the light wave and the radio wave.

One of characteristics of the terahertz wave is that the wave is the shortest wavelength band having a substance transmitting property of the radio wave and the longest wavelength including a rectilinear property of the light wave. That is, the terahertz wave can be transmitted through various substances as in the radio wave, and has a short wavelength (around 1 mm to around 30 μm). Therefore, the highest space resolution is obtained in a radio wave band. Moreover, like the light wave, the terahertz wave can be drawn by a lens and a mirror.

FIG. 1A is a generation principle diagram of this terahertz wave. In this drawing, reference numeral 1 is a non-linear optical crystal (e.g., $LiNbO_3$), 2 is pump light (or referred to as excitation light), 3 is idler light, and 4 is the terahertz wave. It is to be noted that the pump light 2 and the idler light 3 are infrared light having a wavelength of around 1 μm.

When the pump light 2 is incident into the non-linear optical crystal 1 having the Raman activity and a far infrared activity in a constant direction, the idler light 3 and the terahertz wave 4 are generated via a raw excitation wave (a polariton) of the substance by stimulated Raman scattering (or a parametric interaction). In this case, among the pump light 2 ($\omega_p$), the terahertz wave 4 ($\omega_T$) and the idler light 3 ($\omega_i$), a law of conservation of energy represented by Equation (1) and a law of conservation of momentum (a requirement for phase matching) represented by Equation (2) are established. It is to be noted that Equation (2) is a vector, and a requirement for non-colinear phase matching can be satisfied as shown in FIG. 1B.

$$\omega_p = \omega_T + \omega_i \quad (1); \text{ and}$$

$$\kappa_p = \kappa_T + \kappa_i \quad (2).$$

The idler light 3 and the terahertz wave 4 generated at this time have a spatial distribution, and the wavelengths of these waves continuously change in accordance with emission angles of the waves. The generation of the idler and terahertz waves in this single path arrangement is referred to as THz-wave parametric generation (TPG).

It is to be noted that a basic optical parametric process is defined by disappearance of one pump photon, and simultaneous generation of one idler photon and one signal photon. In a case where the idler light or signal light resonates, when pump light intensity exceeds a certain threshold value, parametric oscillation occurs. The disappearance of one pump photon and the simultaneous generation of one idler photon and one polariton are the stimulated Raman scattering, and are included in the parametric interaction in a broad sense.

However, there have been problems that the terahertz wave generated in a terahertz wave generation device having the above single path arrangement is very weak and that a large part of the wave is absorbed while the wave travels several hundreds of micrometers through the non-linear optical crystal. For example, owing to the absorption of the $LiNbO_3$ crystal, the terahertz wave indicates a small value of about 0.1% while the wave travels along a length of 3 mm.

To solve the problems, Patent Documents 1, 2 are disclosed. Moreover, Patent Document (non laid-open) 3, Non-Patent Documents 1, 2 and the like are related to the present invention.

FIG. 2 is a schematic diagram of a submillimeter wave generation device disclosed in Patent Document 1. As shown in this drawing, when idler reflection mirrors M1, M2 are constituted in a specific direction (an angle θ) with respect to broad idler light 3 described above, the intensity of the idler light 3 of the specific direction can be increased. It is to be noted that in this drawing, 5 is a laser unit which emits laser light as pump light 2, and 6 is a prism which guides terahertz wave 4 to the outside. The prism 6 is formed of a material having a small absorption coefficient with respect to the terahertz wave.

FIG. 3 is a schematic diagram of a terahertz wave generation device disclosed in Patent Document 2. As shown in this drawing, first laser light 7 having a single frequency is used as pump light 2, and another second laser light 8 having a single frequency is optically injected in a generation direction of idler light 3. In consequence, an output of the generated terahertz wave can largely be increased. In this drawing, reference numeral 9 is a prism array constituted by arranging a plurality of prisms 6 described above.

[Patent Document 1]
Japanese Patent Application Laid-Open No. 09-146131, "Submillimiter Wave Generation Device"
[Patent Document 2]
Japanese Patent Application Laid-Open No. 2002-072269, "Terahertz Wave Generation Method and Device"
[Patent Document 3]
Japanese Patent Application No. 2003-107885, non laid open
[Non-Patent Document 1]
K. Kawase et. al., "Arrayed silicon prism coupler for a THz-wave parametric oscillator", Applied Optics, vol. 40, No. 9, pp. 1423 to 1426, 2001
[Non-Patent Document 2]
K. Kawase et. al., "Terahertz wave parametric source", Journal of Physics D; Applied Physics, vol. 35, No. 3, pp. R1 to R14, 2002

As described above, when the pump light 2 (the excitation light) is struck on a non-linear optical crystal 1 having the Raman activity and the far infrared activity in a constant direction, idler light 3 and terahertz wave 4 are generated. The idler light 3 and the terahertz wave 4 generated at this time have a spatial distribution in a direction which satisfies a requirement for phase matching, and wavelengths of these waves continuously change in accordance with an emission angle.

Moreover, when the mirrors M1, M2 are constituted in a specific direction with respect to the idler light 3 as shown in FIG. 2, intensities of the idler light 3 and the terahertz wave 4 in the specific direction can be increased.

However, to take out the terahertz wave 4 generated in the crystal, total reflection conditions need to be avoided on a crystal end surface. Therefore, as shown in FIGS. 2, 3, the prism 6 and the prism array 9 have heretofore been formed of a material having a refractive index smaller than that of the non-linear optical crystal 1, and attached to the non-linear optical crystal 1 to take the terahertz wave 4 out of the crystal.

However, such conventional means have the following problems.

(1) Since a generation point of the terahertz wave is present in the non-linear optical crystal, there is a large absorption amount in the crystal. For example, as described above, owing to the absorption of the $LiNbO_3$ crystal, the terahertz wave decreases to about 0.1% while the wave travels along a length of 3 mm.

(2) Since the terahertz wave is obliquely incident into an interface between the non-linear optical crystal and the prism, transmittance decreases, and output efficiency of the terahertz wave is decreased.

(3) An excessively weak output of the terahertz wave is taken out of the single prism. When the prism array is used, the output increases. However, the terahertz wave 4 is scattered and, due to the prism array including a plurality of prisms, a wave front of the terahertz wave is distorted, an emitted beam does not diametrically have a circular shape (or an elliptic shape), and there has been a trouble in application and development.

That is, if the terahertz wave 4 has a rotationally symmetric or ellipsoidic output distribution around an optical axis of the wave, it is possible to adapt a ray trace calculation for the terahertz waves. However, in the conventional means, the generated terahertz wave largely deviates from rotation symmetry. Therefore, it has been difficult to apply a gaussian optical system.

The present invention has been developed to solve such problems. That is, an object of the present invention is to provide a method and an apparatus for generating the terahertz wave in which absorption in a crystal can largely be reduced, output efficiency from an interface to the outside can be increased, and it is possible to obtain a terahertz wave output distribution close to rotation symmetry to which a gausssian optical system is easily applied.

DISCLOSURE OF THE INVENTION

According to the present invention, there is provided a method for generating a terahertz wave, comprising: incident pump light into a non-linear optical crystal capable of generating the terahertz wave owing to a parametric effect; and generating idler light and the terahertz wave in a direction which satisfies a requirement for non-colinear phase matching, wherein one end surface of the non-linear optical crystal is positioned approximately orthogonally to the direction of the generation of the terahertz wave, the pump light and the idler light are totally reflected at an approximately same point on the end face, and the generated terahertz wave is emitted roughly vertically to the end face.

Moreover, according to the present invention, there is provided an apparatus for generating a terahertz wave, comprising: a non-linear optical crystal capable of generating the terahertz wave owing to a parametric effect; and a laser unit which strikes pump light into the non-linear optical crystal, the apparatus being configured to generate idler light and the terahertz wave in a direction which satisfies a requirement for non-colinear phase matching, the apparatus being positioned so that one end face of the non-linear optical crystal is positioned approximately orthogonally to the direction of the generation of the terahertz wave, the pump light and the idler light are totally reflected at an approximately same point on the end surface, and the generated terahertz wave is emitted roughly vertically to the end face.

According to the above method and apparatus of the present invention, since the pump light and the idler light are totally reflected at the approximately same point on one end face of the non-linear optical crystal to generate the terahertz wave, a position where the terahertz wave is generated is distributed along with one face of the crystal. In consequence, absorption in the crystal can largely be reduced.

Moreover, since the generated terahertz wave is emitted roughly vertically to one end face of the non-linear optical crystal, the wave is hardly reflected at the end face (an interface), and output efficiency from the interface to the outside can be increased.

Furthermore, a generation point of the terahertz wave is a total reflection angle for the pump light and the idler light or above the critical angle. The wave is substantially generated at one point and emitted roughly vertically to the end face. Therefore, it is possible to obtain a terahertz wave output distribution close to rotation symmetry to which a gaussian optics study is easily applied.

According to a preferable embodiment of the present invention, incidence angles θp, θi of the pump light and the idler light on the end face of the non-linear optical crystal are larger than total reflection angles, respectively, and an incidence angle of the terahertz wave is smaller than a total reflection angle of the terahertz wave.

According to this means, the pump light and the idler light can totally be reflected at the end face of the non-linear optical crystal, and the terahertz wave can be extracted without being totally reflected.

Moreover, the apparatus further comprises: a first laser unit which outputs first laser light as the pump light; and a climbing or bended type resonator which totally reflects the idler light generated in the non-linear optical crystal at the total reflection point to amplify the idler light. This terahertz generator consists of the first laser as the pump source. The climbing or bended cavity totally reflects the idler light generated in the non-linear optical crystal and amplifies the idler light. It is preferable that the resonator multiplies and reciprocates the idler light to thereby amplify the light.

According to this means, the first laser light can excite the non-linear crystal as the pump light, and the idler light generated in the non-linear optical crystal can totally be reflected at the total reflection point and amplified.

When the climbing type resonator is placed on the rotary stage and rotated to change an angle between the pump light to the resonator, a wavelength of the terahertz wave can continuously be changed. The incidence angle of the pump light can be changed with a movable mirror or the like to change the angle of the pump light to the fixed resonator. Therefore, the wavelength of the terahertz wave can continuously be changed.

Moreover, the apparatus further comprises: a first laser unit which outputs first laser light having a single frequency as the pump light; and a second laser unit which optically injects another second laser light having a single frequency in a direction of the generation of the idler light generated in the non-linear optical crystal. The first laser light having the single frequency as the pump light, and the other second laser light having the single frequency is optically injected in the direction of the generation of the idler light generated in the non-linear optical crystal.

According to this means, the first laser light having the single frequency can be output and incident into the non-linear optical crystal by use of the first laser unit. The other second laser light having the single frequency is optically injected in the direction of the generation of the idler light generated in the non-linear optical crystal by use of the second laser unit. Therefore, an intense idler wave can be generated as compared with a case where the idler wave is generated in the non-linear optical crystal with a parametric interaction only.

In consequence, light intensity of the idler wave in this direction increases, and the intensity of the terahertz wave which satisfies a requirement for non-colinear phase matching can largely increase.

Moreover, since the idler wave intensified by the second laser light has strong directivity and both of the first laser light and the second laser light are the laser light having the single frequency, the directivity of the generated terahertz wave in the generation direction increases. In addition, a spectrum width can be narrowed.

It is preferable that the wavelength or the incidence angle of the pump light is changed to change the wavelength of the terahertz wave.

According to this method, the wavelength of the terahertz wave can be changed.

Moreover, it is preferable that the first laser unit is a variable wavelength laser unit which can change the wavelength of the pump light.

According to this constitution, the wavelength of the pump light can be varied to change the wavelength of the terahertz wave.

According to a preferable embodiment of the present invention, a reflection reducing optics which reduces reflectance of the terahertz wave is disposed at one end face of the non-linear optical crystal.

When a refractive index is set to be close to that of atmosphere in a stepwise manner by use of parallel substrates having a refractive index lower than that of the non-linear optical crystal as such reflection reducing optics, the refractive index can be reduced and the output efficiency of the terahertz wave can be improved. Moreover, when reduced reflection coating is used, the reflection of the terahertz wave at the end face can further be reduced, and the take-out efficiency from the interface to the outside can further be increased.

Moreover, it is preferable that a condenser lens which condenses the terahertz wave is disposed at one end face of the non-linear optical crystal.

According to such a condenser lens, the terahertz wave can be extracted as collimated light. The terahertz wave can be condensed on the end face of a terahertz fiber and can freely be propagated via the terahertz fiber. When a part or all of the reflection reducing optics is used as the condenser lens, optical elements can be functionable and simplified, and an optical system can efficiently be arranged.

As described above, the method and apparatus for generating the terahertz wave according to the present invention have excellent effects that the absorption in the crystal can largely be reduced, the take-out efficiency from the interface to the outside can be increased, and it is possible to obtain the terahertz wave output distribution close to rotation symmetry to which the gaussian optical system is easily applied.

BEST MODE FOR CARRYING OUT THE INVENTION

Figure 1A:
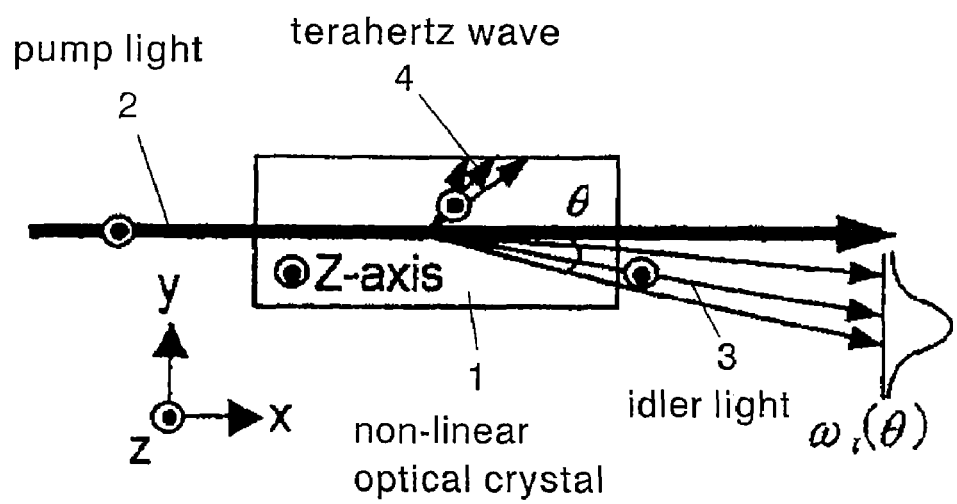
FIGS. 1A and B are generation principle diagrams of a terahertz wave.
Figure 1B:
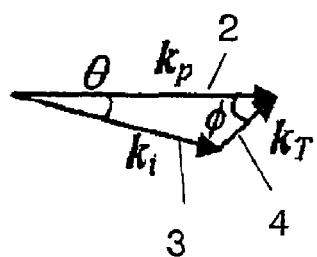
Figure 2:
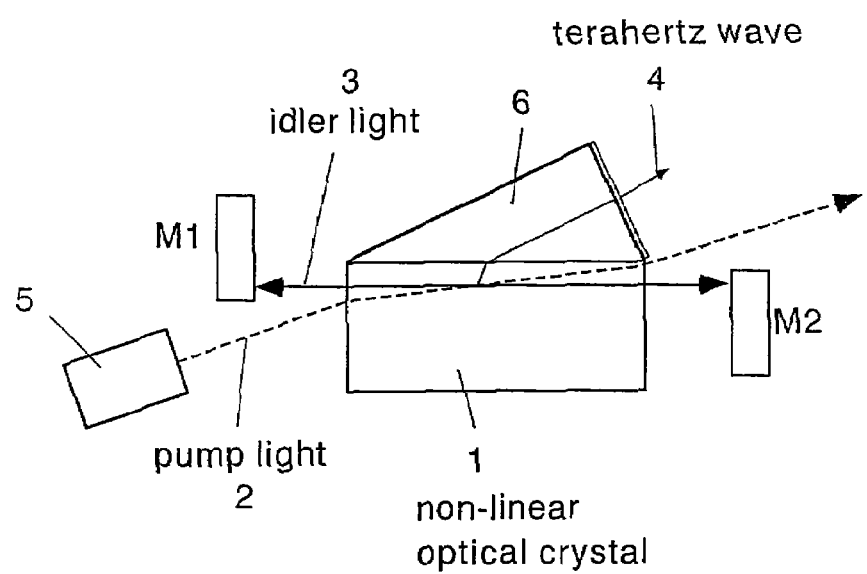
FIG. 2 is a schematic diagram of a submillimeter wave generation device disclosed in Patent Document 1.
Figure 3:
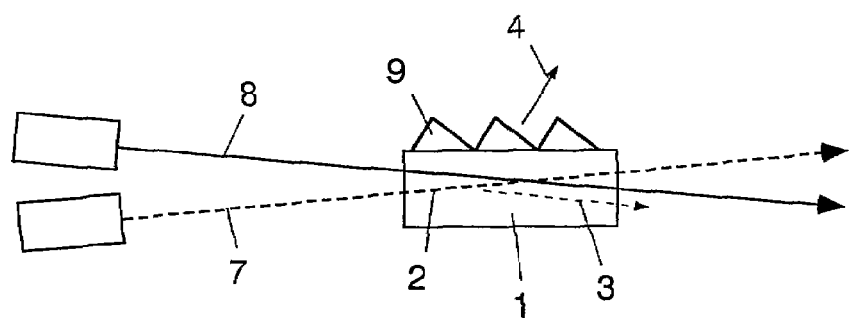
FIG. 3 is a schematic diagram of a terahertz wave generation device disclosed in Patent Document 2.

A preferable embodiment of the present invention will hereinafter be described with reference to the drawings. It is to be noted that in the drawings, a common part is denoted with the same reference numerals, and redundant description is omitted.

Figure 4A:
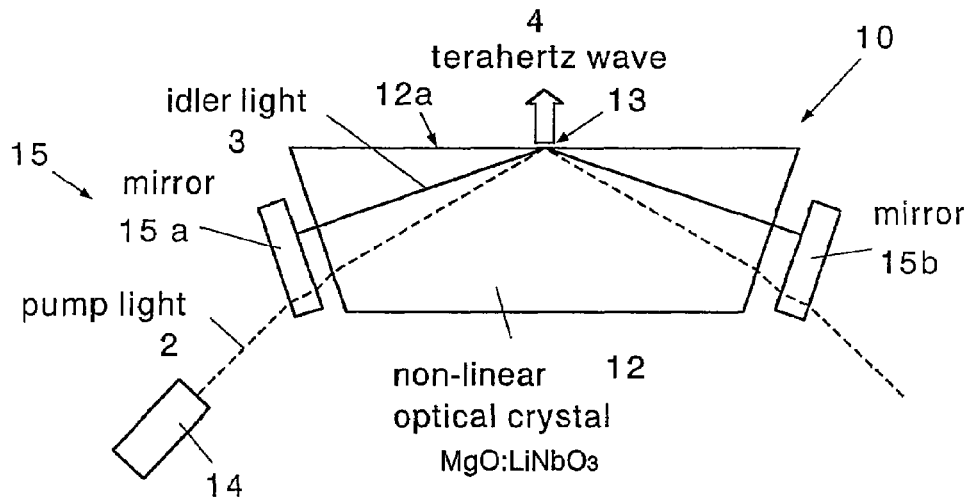
FIGS. 4A and B are diagrams showing a first embodiment of a terahertz wave generation apparatus of the present invention.

FIG. 4A is a diagram showing a first embodiment of a terahertz wave generation apparatus of the present invention.

As described in this drawing, a terahertz wave generation apparatus 10 of the present invention includes a non-linear optical crystal 12 capable of generating a terahertz wave owing to a parametric effect, and a first laser unit 14 which strikes laser light as pump light 2 into the non-linear optical crystal 12, and idler light 3 and terahertz wave 4 are generated in a direction which satisfies a requirement for non-colinear phase matching.

Moreover, in this example, the terahertz wave generation apparatus 10 of the present invention further includes a climbing type or bended resonator 15 which totally reflects and amplifies the idler light 3 generated in the non-linear optical crystal 12 at the same total reflection point 13. The resonator 15 includes two reflective mirrors 15a, 15b. The reflective mirrors 15a, 15b transmit the pump light 2 and reflect the idler light 3 to amplify the idler light 3 generated in the non-linear optical crystal 12.

It is to be noted that instead of this resonator 15, the apparatus may include a second laser unit which optically injects another second laser light having a single frequency in a direction of the generation of the idler light 3 generated in the non-linear optical crystal 12.

Moreover, to vary a wavelength of the generated terahertz wave 4, the first laser unit 14 may be a variable wavelength laser unit capable of changing the wavelength of the pump light 2.

Furthermore, instead of using the variable wavelength laser unit, an incidence angle of the pump light may be changed without modifying another constituting position.

Figure 4B:
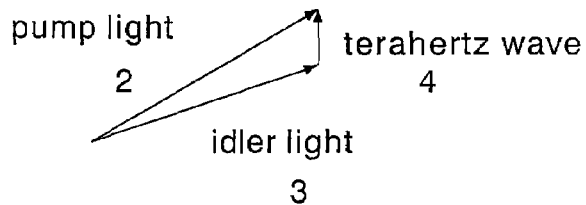

FIG. 4B shows a requirement for angle phase matching at the total reflection point 13.

As shown in this drawing, one end face 12a (an upper surface in this drawing) of the non-linear optical crystal 12 is positioned approximately orthogonally to the direction of the generation of the terahertz wave 4 so that the pump light 2 and the idler light 3 are totally reflected at the approximately same point 13 on this end face 12a, and the generated terahertz wave 4 is emitted perpendicularly to the end face.

Figure 5:
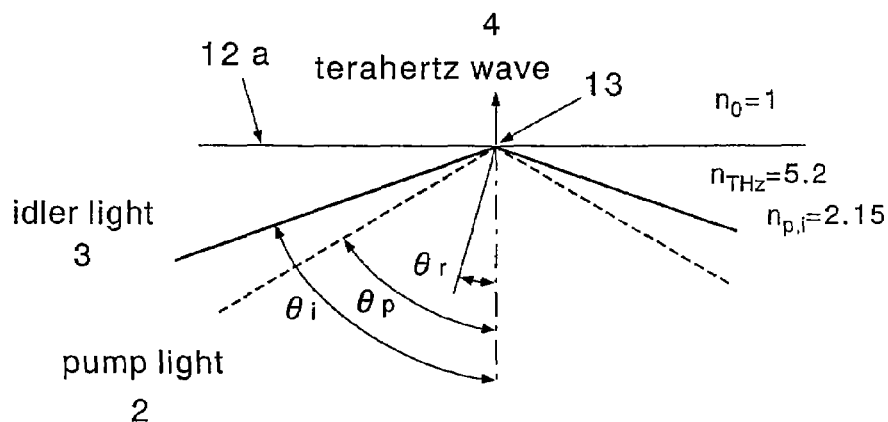
FIG. 5 is an explanatory view of incidence angles of pump light and idler light to a terahertz take-out surface and a refractive index in the present invention.

FIG. 5 is an explanatory view of incidence angles of the pump light and the idler light to a terahertz take-out surface and a refractive index in the present invention.

In this drawing, incidence angles θp, θi of the pump light 2 and the idler light 3 to the end face 12a of the non-linear optical crystal 12 are set to be larger than a total reflection angle θr, respectively. An incidence angle of the terahertz wave 4 to the end face 12a is set to be smaller than the total reflection angle. In this example, the angle is set so that the wave substantially crosses the end face 12a at right angles.

In FIG. 4A, when the pump light 2 (excitation light) enters the non-linear optical crystal 12, the idler light 3 and the terahertz wave 4 are generated owing to a non-colinear parametric effect based on polariton scattering process. The idler light 3 and the terahertz wave 4 generated at this time have a spatial distribution, and the wavelengths of the waves continuously change in accordance with the emission angle of the light.

When the resonator 15 is constituted in a specific direction (the angle θi) with respect to the idler light 3 emitted with this spatial distribution, intensity of the idler light 3 in the specific direction can be increased.

At this time, among three waves of the pump light 2 (the excitation light), the idler light 3 and the terahertz wave 4, requirements for phase matching are established which are a law of conservation of energy and a law of conservation of momentum represented by Equation (1) (2).

The present invention is characterized in that the pump light 2 (the excitation light) is obliquely struck on the end face 12a of the non-linear optical crystal 12, and totally reflected at the end face 12a of the non-linear optical crystal, the climbing type horizontally symmetric resonator 15 is constituted with respect to the total reflection point 13 as a vertex, and the terahertz wave 4 can be extracted substantially perpendicularly to the end face 12a of the non-linear optical crystal 12.

When the terahertz wave 4 is taken out of the end face 12a of the crystal 12 in a vertical direction, reflectance at the end face 12a is suppressed, take-out efficiency of the terahertz wave 4 can be improved, and a beam shape of the emitted terahertz wave 4 can be taken out in the form of a gaussian type beam profile. Furthermore, since the surface radiated the terahertz wave 4 is the total reflection point 13 of the idler light 3, an absorption loss of the terahertz wave 4 by the non-linear optical crystal 12 can be avoided to improve emission efficiency.

As shown in FIG. 4B, during the parametric generation of the terahertz wave 4, an angle of the pump light 2 (the excitation light) comes close to that of the idler light 3, and the light is generated at a comparatively large angle with respect to the terahertz wave 4. Therefore, while the pump light 2 and the idler light 3 are totally reflected at the crystal end face 12a to avoid the transmission loss for resonated idler and to keep the constitution of the resonator 15, the terahertz wave 4 can be emitted perpendicularly to the end face 12a of the non-linear optical crystal 12.

For example, when LiNbO$_3$ is used in the non-linear optical crystal 12, the pump light 2 and the idler light 3 form angles of, for example, 64.3°, 65° with the terahertz wave 4, respectively. Therefore, to generate the terahertz wave 4 vertically (an emission angle of 0°) to the crystal end face 12a, the pump light needs to be struck on the crystal end face at an angle of 64.3°. At this time, two mirrors 15a, 15b need to be arranged so that the idler light is generated at an angle of 65° with respect to the end face.

In FIG. 5, assuming that the pump light 2 has a wavelength of 1.064 μm, the idler light 3 has a wavelength of 1.07 μm, and refractive indexes $n_{p,i}$ of LiNbO$_3$ to these wavelengths are 2.15. Therefore, the total reflection angle θr is 27.7°. Therefore, when the incidence angles θp, θi of the pump light 2 and the idler light 3 are set to 64.3° and 65°, the pump light 2 and the idler light 3 struck on the crystal end face 12a can totally be reflected to constitute the climbing type resonator 15.

Figure 6:
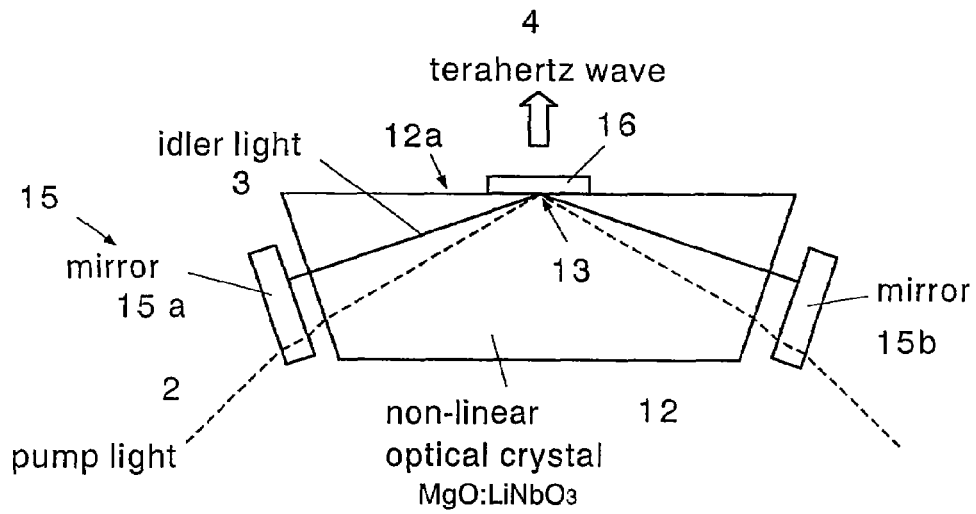
FIG. 6 is a diagram showing a second embodiment of the terahertz wave generation apparatus of the present invention.

FIG. 6 is a diagram showing a second embodiment of the terahertz wave generation apparatus of the present invention. In this example, a reflection reducing material 16 which reduces reflectance of a terahertz wave 4 is disposed at one end face 12a of a non-linear optical crystal 12. A refractive index and/or a thickness of this reflection reducing material 16 is designed and selected in order to reduce the reflectance of the terahertz wave 4 at the crystal end face 12a. More preferably, a material has a small absorption coefficient of the terahertz wave 4 and a low refractive index. It is preferable to design the thickness so that offsetting interference is caused to reduce reflection and transmittance is set to be close to 100%.

A transmittance T at a boundary surface (the end face 12a) also depends on a refractive index difference. When the terahertz wave 4 is taken out from the non-linear optical crystal 12 to the atmosphere, the low refractive index material 16 can be attached to the end face 12a of the non-linear optical crystal 12 to surpress internal reflection and improve take-out efficiency to the atmosphere.

In general, the transmittance of light depends on an incidence angle at the boundary surface having a different refractive index. For example, when LiNbO$_3$ is used as the non-linear optical crystal 12, a refractive index $n_{THz}$ of a terahertz wave band is 5.2.

Figure 7:
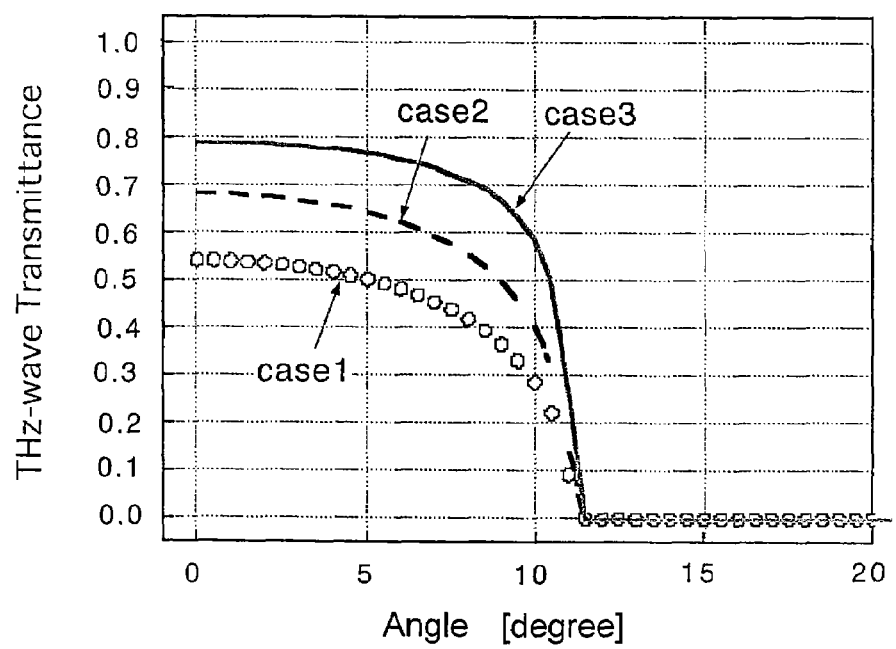
FIG. 7 is a diagram of relation between the incidence angle and the transmittance of a terahertz wave in the present invention.

FIG. 7 is a diagram of relation between the incidence angle and the transmittance of the terahertz wave in the present invention. In this drawing, the abscissa indicates the incidence angle, the ordinate indicates the transmittance, and results of calculation of the transmittance of the terahertz wave generated in the atmosphere are shown.

Moreover, in this drawing, a circle mark (Case 1) indicates the transmittance of the boundary surface between LiNbO$_3$ and the atmosphere in a case where an LiNbO$_3$ crystal is used in the non-linear optical crystal and the terahertz wave is directly taken out from the LiNbO$_3$ crystal (terahertz wave refractive index: 5.25) to the atmosphere.

It is seen from this diagram that the transmittance is maximized at an incidence angle of 0°, and decreases, as the incidence angle increases. This means that an angle at which the terahertz wave generated at LiNbO$_3$ is most efficiently taken out is the incidence angle of 0°, that is, a time when the wave is emitted vertically from the non-linear optical crystal. That is, it is seen that, in a case where the terahertz wave 4 is taken out vertically from the non-linear optical crystal 12, the terahertz wave can most efficiently be taken out.

In FIG. 6, Case 2 and Case 3 show a case where a substrate having a low refractive index is attached as the reflection reducing material 16. Case 2 is a case where the substrate of MgO (a refractive index of 3.25) having the low refractive index is attached to the end face of LiNbO$_3$, and Case 3 is a case where the substrate 16 of MgO having the low refractive index and a resin (a refractive index of 1.5) transparent to the terahertz wave are attached to the end face of LiNbO$_3$.

It is seen from FIG. 6 that vertical incidence (an emission angle of 0°) provides the highest transmittance in any of Case 1 to Case 3. It is to be noted that as the resin which is transparent to the terahertz wave, a resin disclosed in Patent Document 3 (Japanese Patent Application No. 2003-107885) is usable.

In addition, conditions of this low refractive index are conditions that the pump light and the idler light are totally reflected at the end face of the non-linear optical crystal. For example, in a case where the LiNbO$_3$ crystal is used in the non-linear optical crystal and an MgO crystal is used as the reflection reducing member, the refractive indexes of LiNbO$_3$ and MgO with respect to the pump light and the idler light are 2.15 and 1.72, respectively, and the total reflection angle at the boundary surface is 53.1°. To vertically emission the terahertz wave, since the incidence angles of the pump light and the idler light on the crystal are 64.3° and 65°, the pump light and the idler light are struck on the crystal end face at 64.3°, 65°. Since the angles are large than the total reflection angle of 53.1°, the climbing type resonator can be constituted.

In addition to the above climbing type resonator constitution, the reflection reducing member is constituted with respect to the terahertz wave vertically emitted from the crystal end face, and a total reflecting material is attached with respect to the pump light and the idler light. In consequence, the terahertz wave can further efficiently be taken out. Moreover, to efficiently take out the terahertz wave, in addition to or instead of the low refractive index substrate 16, a material (AR coating) having a thickness designed for causing the offsetting interference to inhibit the reflection can be combined.

When the terahertz wave 4 is vertically taken out of the end face 12a of the non-linear optical crystal, the terahertz wave can substantially be taken out in the form of the gausssian type beam profile without any disturbance in the beam shape.

That is, in a conventional technique, the silicon prism array 9 has been used in taking out the terahertz wave. Therefore, a wave front is disturbed, and a plurality of lenses needs to be used in condensing the light. However, in the present invention, since the terahertz wave is emitted from a plane, the wave is emitted with a gaussian type beam diameter. Therefore, the above problems can be solved.

Figure 8:
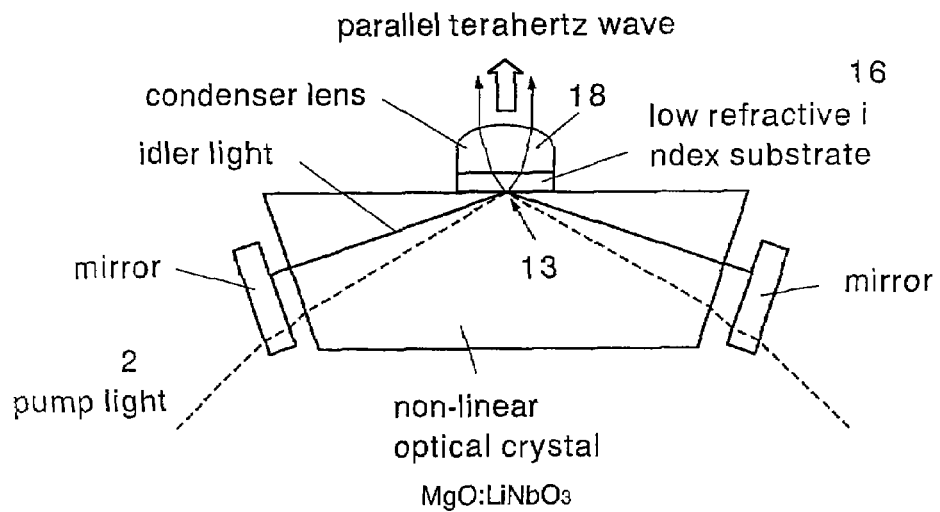
FIG. 8 is a diagram showing a third embodiment of the terahertz wave generation apparatus of the present invention.
Figure 9:
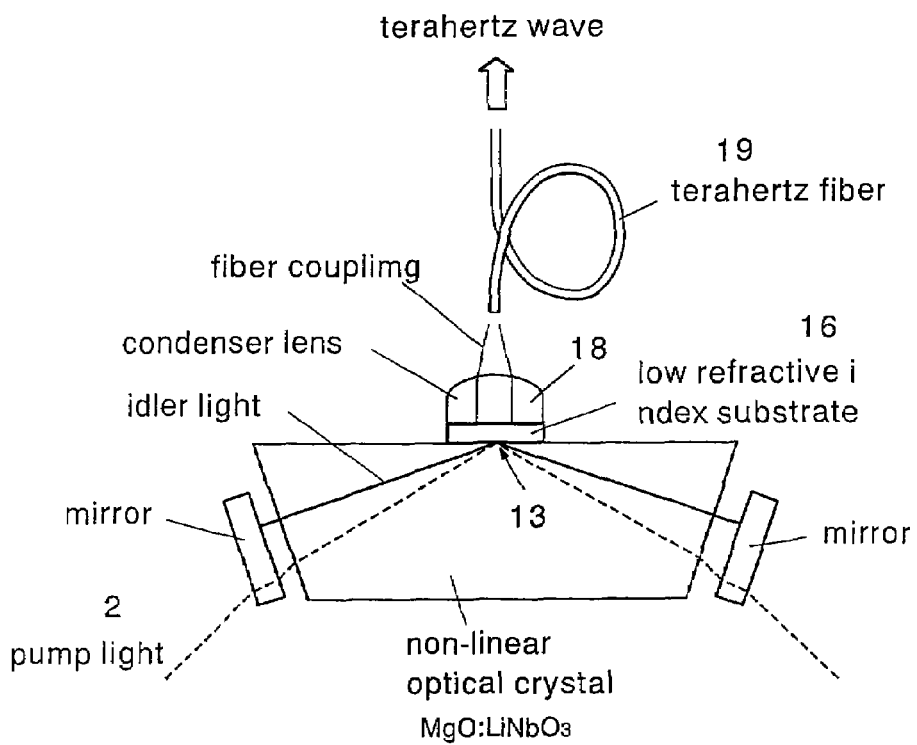
FIG. 9 is a diagram showing a fourth embodiment of the terahertz wave generation apparatus of the present invention.

FIGS. 8 and 9 are diagrams showing third and fourth embodiments of the terahertz wave generation apparatus of the present invention. In this example, in addition to a low refractive index substrate 16, a condenser lens 18 which condenses a terahertz wave 4 is directly attached to one end face 12a of a non-linear optical crystal 12.

It is to be noted that a collimate lens formed of the above reflection reducing member as a material may directly be attached.

As shown in FIGS. 8, 9, the lens 18 can be attached immediately after a terahertz wave generation point 13 to form parallel light with a small beam diameter. In addition, this resin lens performs a function of the reflection reducing member. Heretofore, the wave has been once taken out to the atmosphere, and the beam diameter is reduced with a plurality of lenses, or a part of the beam is cut out to reduce the beam diameter. This generates a loss at each optical component end face, but this problem can be solved as described above.

Moreover, since the resin lens can be used, as shown in FIG. 9, a fiber coupler constituted by combining a lens 18 and a terahertz fiber 19 can directly be attached.

EXAMPLE 1

Figure 10:
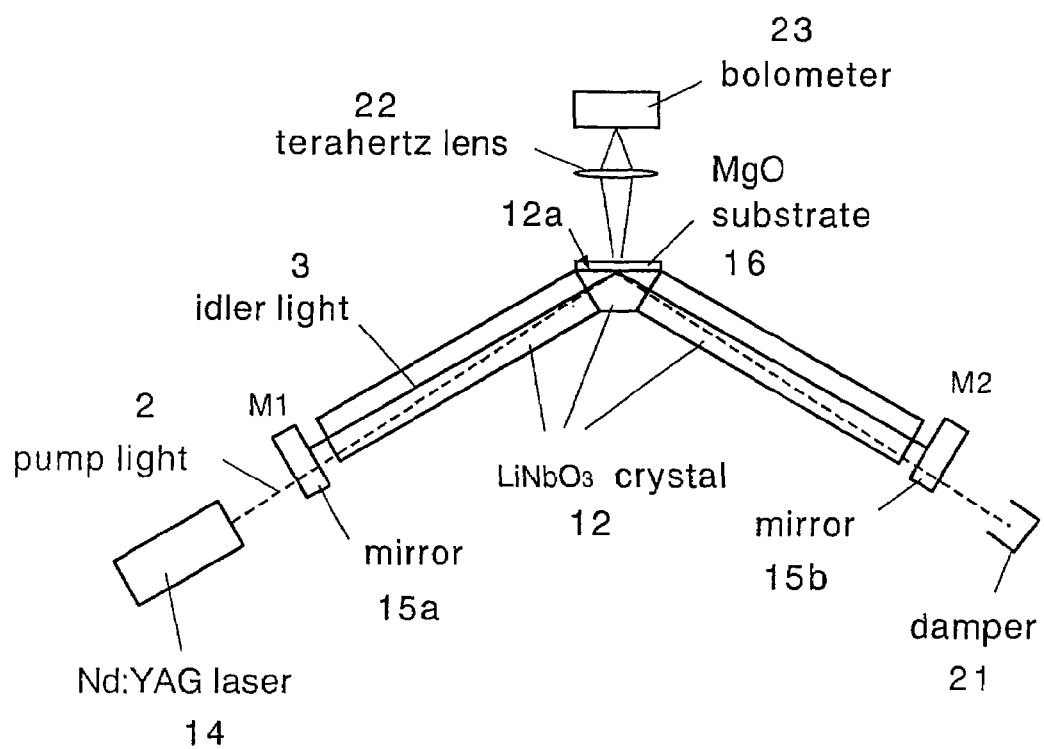
FIG. 10 is a constitution diagram of an experiment optical system of the terahertz wave generation apparatus of the present invention.

FIG. 10 is a constitution diagram of an experiment optical system of the terahertz wave generation apparatus of the present invention.

In this example, a non-linear optical crystal 12 is constituted of two LiNbO$_3$ crystals of 4×5×50 mm and a trapezoidal LiNbO$_3$ crystal. An MgO substrate 16 having a thickness of 1 mm is attached to a top end face 12a of the non-linear optical crystal 12, and terahertz wave 4 is taken out of the substrate. An Nd:YAG laser 14 was used in order to strike pump light 2. The pump light 2 enters a resonator from a mirror (M1) 15a, is reflected at a climbing point (the top end face 12a) and is emitted from a mirror (M2) 15b. Idler light 3 generated in the crystal resonates and is amplified at the resonator mirrors M1, M2, and the terahertz wave 4 is emitted from the climbing point 12a in a vertical direction. The emitted terahertz wave 4 is detected by a bolometer detector 23 via the MgO substrate 16 and a lens 22 for terahertz. It is to be noted that reference numeral 21 is a damper which interrupts the pump light 2.

Figure 11:
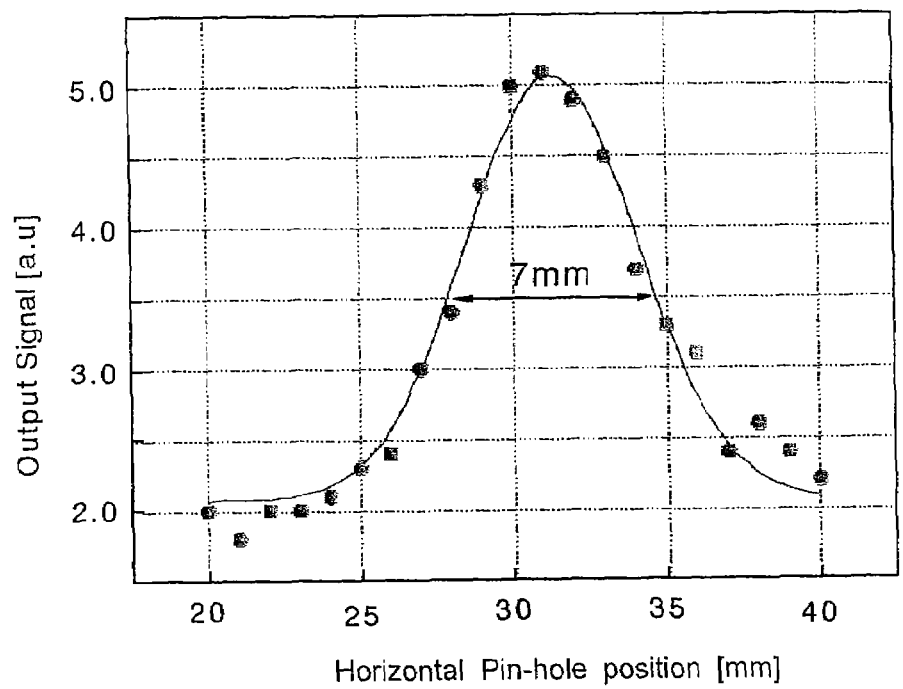
FIG. 11 is a diagram showing a beam shape of the terahertz wave generated in the present invention.

FIG. 11 is a diagram showing a beam shape of the terahertz wave generated in this example. This diagram shows the beam shape in a lateral direction measured at about 20 cm from the MgO substrate 16. The measurement was performed by scanning a pinhole of 1 mmφ with a stage to plot intensity.

It has been confirmed from this drawing that a full width at half maximum is about 7 mm, and the beam is substantially emitted in a gauss shape. The terahertz wave at this time is 1.6 THz.

Figure 12:
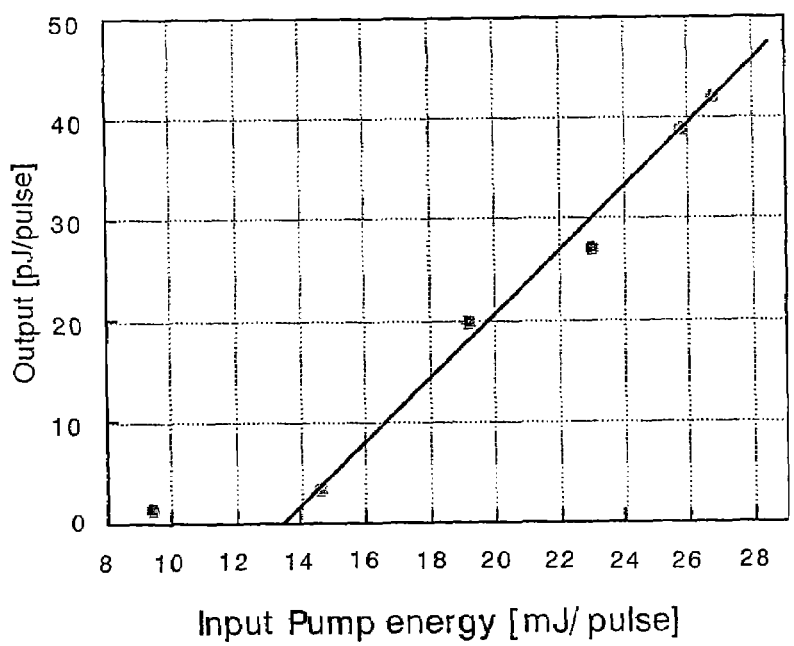
FIG. 12 is an input/output characteristic diagram of the terahertz wave generated in the present invention.

FIG. 12 is an input/output characteristic diagram of the terahertz wave generated in the present invention. As shown in this diagram, an oscillation threshold value was 13.5 mJ/pulse. A pump light input is 26 mJ/pulse, whereas an output of the terahertz wave is 42 pJ/pulse. An output substantially equal to that of a conventional terahertz wave parametric oscillator was observed. This is approximately five times saturated energy of the bolometer detector, and sufficient output energy for each type spectrum measurement.

As described above, heretofore a prism array has been used in taking out the terahertz wave. Therefore, the shape of the beam just emitted from the crystal was jagged.

On the other hand, according to the present invention, it has also been confirmed from the example of FIG. 11 that the generation point of the terahertz wave is the total reflection point or the vicinity of the point of the pump light and the idler light, the light is substantially generated at one point and emitted substantially vertically to the end face, and it is therefore possible to obtain an output distribution of the terahertz wave close to rotation symmetry to which a gaussian optical system is easily applied.

Moreover, according to the present invention, the terahertz wave can vertically be taken out of the crystal end face to reduce a loss, avoid disturbance of a wave front and improve the beam shape. Since this constitution is used, as described in the embodiment, the AR coating, the terahertz wave fiber or the like can integrally be attached to a light source, which has heretofore been difficult.

According to the present invention, in the constitution of the terahertz wave parametric oscillator, the pump light and the idler light are reflected at the end face of the non-linear optical crystal to constitute the climbing type resonator having a reflection point as a vertex. A reflection angle of the pump light at the end face is set so that the pump light itself and the idler light are totally reflected, and the terahertz wave is vertically emitted to a reflection surface under a requirement for angle phase matching.

At this time, it is important to attach, to a terahertz wave emission point (the reflection point of the pump light and the idler light), a material which totally reflects the pump light and the idler light and which reduces the reflection of the terahertz wave.

For example, since the MgO crystal has a refractive index of 1.72 with respect to the pump light and the idler light and a refractive index of 3.25 with respect to the terahertz wave, the reflection of the terahertz wave can be reduced at the non-linear optical crystal surface, and the resonator can be constituted with respect to the idler light. The lens 18, a resin or the like may be attached to the MgO substrate 16.

It is to be noted that the present invention is not limited to the above examples and embodiments. Needless to say, the present invention can variously be modified within the scope of the present invention.

The invention claimed is:

1. A method for generating a terahertz wave comprising: striking pump light into a non-linear optical crystal which generates the terahertz wave owing to a parametric effect; and generating idler light and the terahertz wave in a direction which satisfies a requirement for non-colinear phase matching,
   wherein one end face of the non-linear optical crystal is positioned approximately orthogonally to the direction of the generation of the terahertz wave, the pump light and the idler light are totally reflected at an approximately same point on the end face, and the generated terahertz wave is emitted roughly vertically to the end face.

2. The method for generating the terahertz wave according to claim 1, wherein incidence angles θp, θi of the pump light and the idler light on the end face of the non-linear optical crystal are larger than total reflection angles, respectively, and an incidence angle of the terahertz wave is smaller than a total reflection angle of the terahertz wave.

3. The method for generating the terahertz wave according to claim 1, wherein a climbing type resonator is constituted which strikes first laser light as the pump light and which totally reflects the idler light generated in the non-linear optical crystal at the total reflection point to amplify the idler light.

4. The method for generating the terahertz wave according to claim 1, wherein first laser light having a single frequency is used as the pump light, and another second laser light having a single frequency is optically injected in a direction of the generation of the idler light generated in the non-linear optical crystal.

5. The method for generating the terahertz wave according to claim 1, wherein a wavelength or an incidence angle of the pump light is changed to change a wavelength of the terahertz wave.

6. An apparatus for generating a terahertz wave comprising: a non-linear optical crystal which generates the terahertz wave owing to a parametric effect; and a laser unit which strikes pump light into the non-linear optical crystal, the apparatus being configured to generate idler light and the terahertz wave in a direction which satisfies a requirement for non-colinear phase matching,
   the apparatus being positioned so that one end face of the non-linear optical crystal is positioned approximately orthogonally to the direction of the generation of the terahertz wave, the pump light and the idler light are totally reflected at an approximately same point on the end face, and the generated terahertz wave is emitted close to perpendicular to the end face.

7. The apparatus for generating the terahertz wave according to claim 6, wherein incidence angles θp, θi of the pump light and the idler light on the end face of the non-linear optical crystal are larger than total reflection angles, respectively, and an incidence angle of the terahertz wave is smaller than a total reflection angle of the terahertz wave.

8. The apparatus for generating the terahertz wave according to claim 6, further comprising:
   a first laser unit which outputs first laser light as the pump light; and
   a climbing type resonator which totally reflects the idler light generated in the non-linear optical crystal at the total reflection point to amplify the idler light.

9. The apparatus for generating the terahertz wave according to claim 8, wherein the first laser unit is a variable wavelength laser unit which can change a wavelength of the pump light.

10. The apparatus for generating the terahertz wave according to claim 6, further comprising:
    a first laser unit which outputs first laser light having a single frequency as the pump light; and
    a second laser unit which optically injects another second laser light having a single frequency in a direction of the generation of the idler light generated in the non-linear optical crystal.

11. The apparatus for generating the terahertz wave according to claim 10, wherein the first laser unit is a variable wavelength laser unit which can change a wavelength of the pump light.

12. The apparatus for generating the terahertz wave according to claim 6, wherein a reflection reducing member which reduces reflectance of the terahertz wave is disposed at one end face of the non-linear optical crystal.

13. The apparatus for generating the terahertz wave according to claim 6, wherein a condenser lens which condenses the terahertz wave is disposed at one end face of the non-linear optical crystal.

* * * * *